(Specimens.)

J. P. WETHERILL.
APPARATUS FOR FILTERING AND SEPARATING METALS.

No. 334,207. Patented Jan. 12, 1886.

2 Sheets—Sheet 1.

WITNESSES:
A. Schiehl.
Ernst Wolff.

INVENTOR
John Price Wetherill
BY Goepel & Raegener
his ATTORNEYS.

(Specimens.)
J. P. WETHERILL.
APPARATUS FOR FILTERING AND SEPARATING METALS.
No. 334,207.                                   Patented Jan. 12, 1886.
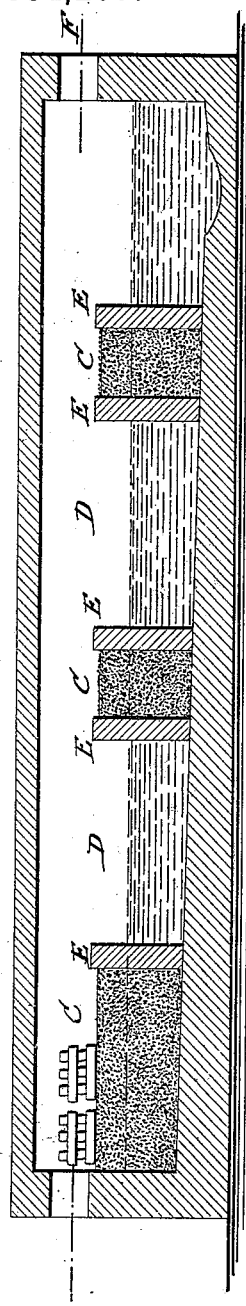
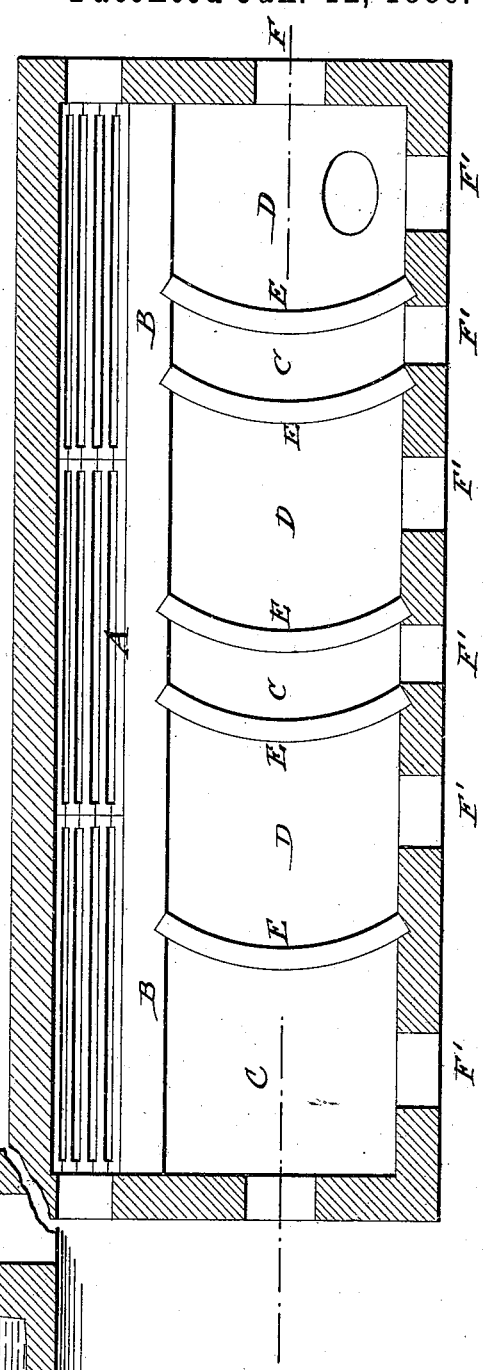
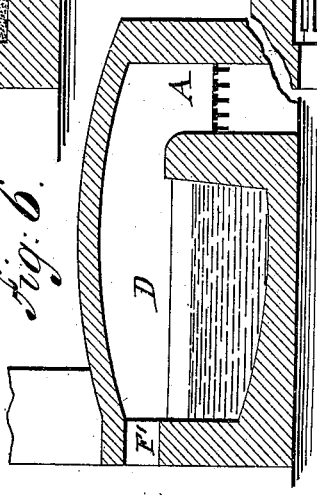
WITNESSES:
A. Schehl.
Ernst Wolff.
INVENTOR
John Price Wetherill
BY
Goepel & Raegener
his ATTORNEYS.

UNITED STATES PATENT OFFICE.

JOHN PRICE WETHERILL, OF BETHLEHEM, PENNSYLVANIA.

APPARATUS FOR FILTERING AND SEPARATING METALS.

SPECIFICATION forming part of Letters Patent No. 334,207, dated January 12, 1886.

Application filed July 15, 1885. Serial No. 171,660. (No model.)

*To all whom it may concern:*

Be it known that I, JOHN PRICE WETHERILL, of Bethlehem, in the county of Northampton and State of Pennsylvania, have invented certain new and useful Improvements in Apparatus for Filtering and Separating Metals, of which the following is a specification.

This invention relates to an improved apparatus for separating or purifying metals and alloys of metals, the construction of which is based upon the principle that metals and alloys of metals of different fusing temperatures can be separated by filtration through substances that remain insoluble in the molten metals or alloys, and that a further separation or purification of the metals takes place owing to the difference in their specific gravity.

The invention consists of a reverberatory furnace divided in its lower portion by loosely-built transverse walls into one or more chambers filled with refractory filtering material and one or more settling-chambers, said filtering and settling chambers being so arranged that the metals or alloys of metals to be separated or purified are in direct communication with the heat.

Figure 1:
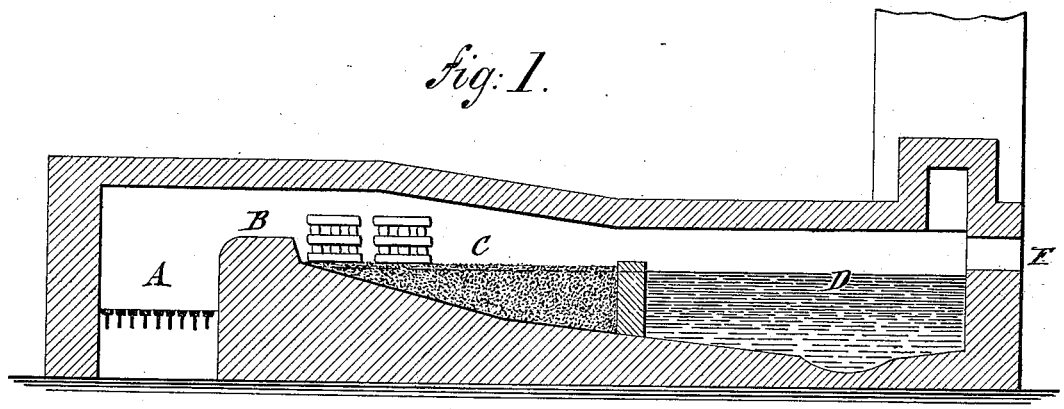
Figure 2:
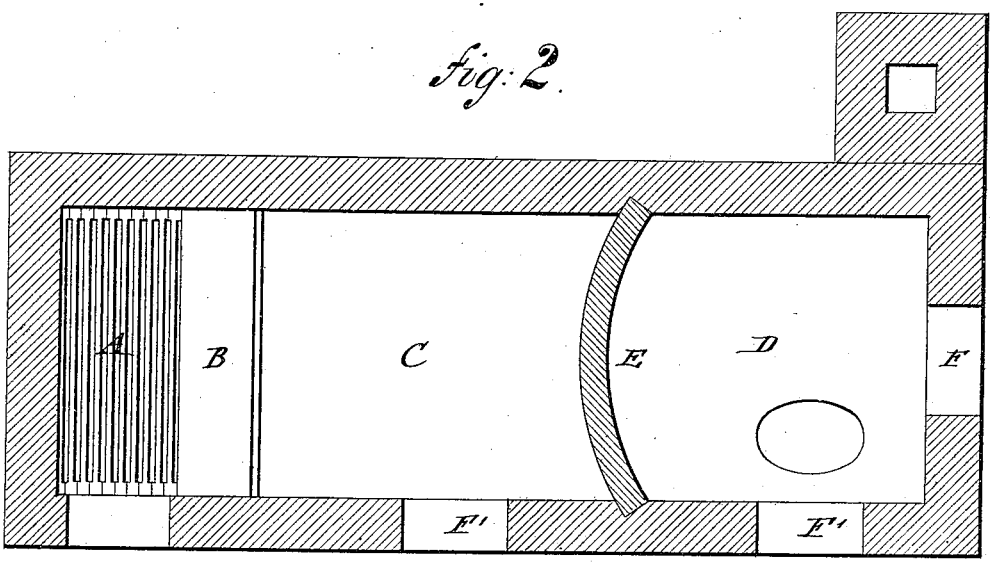
Figure 3:
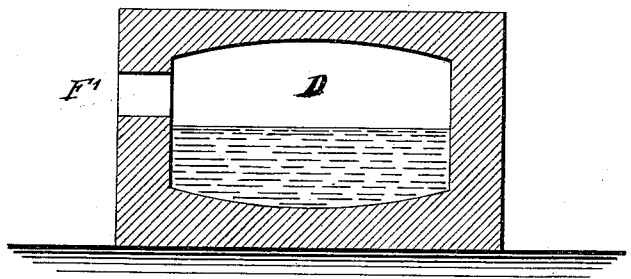

In the accompanying drawings, Figure 1 represents a vertical longitudinal section, Fig. 2 a horizontal section, and Fig. 3 a vertical transverse section, of my improved apparatus for separating or purifying metals and alloys of metals in its simplest form; and Figs. 4, 5, and 6 are respectively a vertical longitudinal section, a plan, and a vertical transverse section, of an apparatus with several filtering and settling chambers.

Similar letters of reference indicate corresponding parts.

Referring to the drawings, A represents the fire-box of a reverberatory furnace; B, the fire-bridge of the same; C, the filtering-chamber, and D the settling-chamber, of the same. The bottom of the furnace is made sloping, and provided at its lowest point with a depression that serves to facilitate the removal of the last portion of the metal from the same when it is desired to clean out the furnace. The filtering and settling chambers C and D are separated by a transverse arc-shaped wall, E, which is built up with bricks of refractory material without mortar or cement, the bricks being laid loosely so as to permit the passage of the metals or alloys to be separated or purified. The filtering-chamber C is filled nearly up to the level of the top of the wall E with a suitable refractory filtering material, such as gravel, sand, or ground ganister, upon which the metals or alloys of metals desired to be separated or purified are placed, so as to be exposed to the heat from the fire-place A. In place of the materials mentioned, any other refractory filtering material that is not destroyed or decomposed by the molten metals or alloys may be used, provided that the same be reduced to a suitable degree of fineness, dependent upon the metal or alloy to be treated. The side wall of the furnace is provided with doors F' for charging the metals or alloys into the filtering-chamber C and for removing the molten metal or alloy from the settling-chamber D.

The temperature of the furnace is maintained at a point intermediately between the fusing-points of the metals or alloys upon the filter in the chamber C, whereby the metal or alloy having the lower fusing-point melts, and, passing through the filter and the interstices in the wall E, enters the settling-chamber D, while the metal having the higher fusing-point is retained on or in the filtering material.

In the settling-chamber D the molten metal or alloy is allowed to stand in contact with the heat, whereby the heavier metal settles to the lower portion of the furnace, while the lighter metal rises above it, if such further separation be necessary. From the settling-chamber D the pure metal or alloy is ladled out at the door provided for that purpose. The heavier metal or alloy is allowed to accumulate in the furnace, and from time to time is ladled onto the filtering material and subjected a second time to the filtering process.

By means of the door F in the end wall of the furnace the filtering material may be removed when clogged and replaced with fresh, and the wall E also re-erected, without stopping the firing.

Where the metals or alloys of metals to be separated are difficult of separation or purification, a repetition of the process is secured in one apparatus by the use of a furnace having a number of alternating filtering and settling chambers, as shown in Figs. 4, 5, and 6. The filtering-chambers C C C have double transverse walls E E, except the first one, the space between them being filled with the filtering material. The metals or alloys to be operated upon are put in the first filtering-chamber, while the purified or separated metal is ladled out from the last settling-chamber only. It therefore follows that it must pass through each settling and filtering compartment and be subjected to the operation of each one. The fire-place A and the fire-bridge B are in this case arranged, preferably, along one side of the filtering and settling chambers, as shown in Fig. 5, in order to secure a more uniform temperature throughout the entire furnace. The furnace is also provided with suitable doors, F F′, in the side and end walls for ladling out the metal, so that the filtering material may be removed when clogged and fresh put in, as well as the transverse walls E E re-erected, without stopping the firing.

The tendency of the filtering material to float in the molten metal is overcome by the weight of the metals or alloys of metals to be separated or purified resting upon it, or by added weights, if necessary, when the filter is started for use.

After the filter has been used for some time the heavier alloys settle in it and constitute, with the material of the filter, a filtering material dense enough to remain in the molten metal, yet porous enough to perform the operation of filtering for a space of time varying from one to two weeks.

Practical experiments have demonstrated that successful results were obtained by an apparatus which is so constructed that the filtering material is almost entirely submerged in the molten metal either continuously or at short intervals. If this be not observed, the impurities or metals or alloys retained in the filter cement the filtering material together after a very short period and prevent the filtration, thus rendering the process unsuccessful. When the filtering material was thus clogged or cemented, it became practically almost impossible to remove it and put in a fresh one, as the impurities, alloys, or metals retained in it formed a hard compact mass with the filtering material that could only be removed by chipping off in small fragments with a chisel-bar at great cost of labor and loss of time to the operation. A further objection is that when a filter became so cemented it acquired a tendency to expand or swell, so much so as to burst its retaining-inclosure, while an apparatus that admitted the submersion of the filter in molten metal either continuously or at such short intervals as may be found necessary overcomes all these difficulties and gives practically successful results.

I am aware that the separation of metals by filtration has heretofore been proposed by the insertion of the metals, together with coal or coke, which is designed to constitute the filter, in clay muffles; but in that case the expansion of the metals in the filter breaks the muffles and renders the process practically unsuccessful. Moreover, such vessels are necessarily small, and only small quantities of metals could be treated at one time, and the metals are heated by the indirect contact of the fire-gases, involving the consumption of a comparatively large amount of fuel. In my apparatus the metals are in direct contact with the fire-gases, and large quantities can be successfully treated at the same time and with a comparatively small quantity of fuel.

In application No. 171,661, filed July 15, 1885, I have claimed the process of separating metals, for the carrying out of which this improved furnace is especially adapted.

Having thus described my invention, I claim as new and desire to secure by Letters Patent—

1. A furnace for separating or purifying metals or alloys of metals, consisting of one or more chambers filled with refractory filtering material, one or more loosely-built walls of fire-bricks, one or more settling-chambers, and a fire-place for keeping the temperature in all the chambers at a certain uniform height, substantially as set forth.

2. A furnace for separating or purifying metals or alloys of metals, consisting of a fire-box and fire-bridge, one or more chambers filled with refractory material, one or more settling-chambers, and one or more loosely-built transverse walls of refractory material that separate the filtering and settling chambers, said chambers having openings in the side and end walls, substantially as set forth.

3. A furnace for separating or purifying metals or alloys of metals, consisting of a fire-box and fire-bridge, one or more chambers filled with refractory filtering material, one or more settling-chambers, loosely-built transverse walls of refractory material for separating the filtering and settling chambers, said chambers being in direct contact with the heat and arranged at nearly the same level, so as to permit the filtering material to be almost entirely submerged in the molten metal or alloy, substantially as set forth.

In testimony that I claim the foregoing as my invention I have signed my name in presence of two subscribing witnesses.

JOHN PRICE WETHERILL.

Witnesses:
PAUL GOEPEL,
MARTIN PETRY.